United States Patent
Bolton et al.

(10) Patent No.: US 9,418,547 B2
(45) Date of Patent: Aug. 16, 2016

(54) ADAPTIVE DRIVER ASSISTANCE ALERTS FUNCTIONALITY

(71) Applicant: Continental Automotive Systems, Inc., Auburn Hills, MI (US)

(72) Inventors: Zachary Joseph Bolton, Birmingham, MI (US); Jeremy Jason McClain, Oxford, MI (US); Tejas Bhupendra Desai, Troy, MI (US); Stephan Wetzel, Bad Homburg (DE); Jorg Witthaus, Darmstadt (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 65 days.

(21) Appl. No.: 14/147,962

(22) Filed: Jan. 6, 2014

(65) Prior Publication Data

US 2014/0191883 A1      Jul. 10, 2014

Related U.S. Application Data

(60) Provisional application No. 61/748,918, filed on Jan. 4, 2013.

(51) Int. Cl.
*G08B 5/00* (2006.01)
*G08B 21/00* (2006.01)
*H05B 39/00* (2006.01)
*G08B 5/22* (2006.01)
(Continued)

(52) U.S. Cl.
CPC .............. *G08G 1/0962* (2013.01); *B60Q 9/008* (2013.01); *B60W 40/08* (2013.01); *B60W 50/14* (2013.01); *B60W 2050/143* (2013.01); *B60W 2540/22* (2013.01); *B60W 2540/30* (2013.01)

(58) Field of Classification Search
CPC ................... B60K 2350/203; B60K 2350/965; B60K 28/06; B60Q 1/50; B60Q 1/52; B60Q 3/0216; B60Q 3/0293; B60Q 9/008; B60Q 1/2669; B60Q 1/38
See application file for complete search history.

(56) References Cited

U.S. PATENT DOCUMENTS 6,140,934 A * 10/2000 Lam ........................... 340/815.4
6,160,475 A * 12/2000 Hornung et al. ............... 340/461
(Continued)

FOREIGN PATENT DOCUMENTS

DE           19818236 A1 * 10/1999   ............... G08G 1/16
DE       102008064022 A1    9/2009
(Continued)

OTHER PUBLICATIONS

European Search Report for European Patent Application No. 14150242.7 completed on Mar. 26, 2014.
(Continued)

*Primary Examiner* — Jennifer Mehmood
*Assistant Examiner* — Muhammad Adnan

(57) ABSTRACT

A driver assistance system for a vehicle includes a plurality of lights linearly arranged substantially around an interior perimeter of the vehicle. A controller is controllably coupled to the plurality of lights, such that the controller is operable to control the plurality of lights. A hazard detection system is communicatively coupled to the controller. The controller includes a non-transitory computer readable medium storing instructions for causing the controller to illuminate at least one of the plurality of lights corresponding to a location of a hazard detected by the hazard detection system.

13 Claims, 3 Drawing Sheets

(51) Int. Cl.
*G08B 5/36* (2006.01)
*B64D 47/06* (2006.01)
*G08G 1/0962* (2006.01)
*B60W 50/14* (2012.01)
*B60Q 9/00* (2006.01)
*B60W 40/08* (2012.01)

(56) References Cited

U.S. PATENT DOCUMENTS

| | | | |
|---|---|---|---|
| 6,985,073 B1* | 1/2006 | Doan | 340/425.5 |
| 7,920,102 B2* | 4/2011 | Breed | B60K 35/00 340/991 |
| 8,218,832 B2* | 7/2012 | Inada | 382/118 |
| 2009/0295906 A1* | 12/2009 | Kushimoto et al. | 348/36 |
| 2010/0014711 A1* | 1/2010 | Camhi et al. | 382/104 |
| 2010/0253501 A1* | 10/2010 | Gibson | 340/475 |
| 2010/0302020 A1* | 12/2010 | Lenneman et al. | 340/441 |
| 2011/0221589 A1* | 9/2011 | LeBeau et al. | 340/468 |
| 2012/0089321 A1 | 4/2012 | Jung | |
| 2012/0143391 A1* | 6/2012 | Gee | 701/1 |
| 2013/0155254 A1* | 6/2013 | Kanto et al. | 348/164 |
| 2014/0002254 A1* | 1/2014 | Reuschel et al. | 340/438 |
| 2014/0309856 A1* | 10/2014 | Willson-Quayle | 701/36 |

FOREIGN PATENT DOCUMENTS

| | | |
|---|---|---|
| DE | 102010020566 A1 | 11/2011 |
| DE | 102010053395 A1 | 6/2012 |
| DE | 102011014262 A1 | 9/2012 |
| EP | 2174833 A2 | 4/2010 |

OTHER PUBLICATIONS

European Search Report, Application No. 14150242.7, dated Apr. 4, 2014.

* cited by examiner

ADAPTIVE DRIVER ASSISTANCE ALERTS FUNCTIONALITY

CROSS-REFERENCE TO RELATED APPLICATIONS

This disclosure claims priority to U.S. Provisional Application No. 61/748,918, which was filed on Jan. 4, 2013 and is incorporated herein by reference.

TECHNICAL FIELD

The present disclosure relates to automotive vehicles, and more particularly to a driver assistance system for an automotive vehicle.

BACKGROUND

Advancements in available sensor technologies allow for improved safety systems for vehicles. One such improved system is an arrangement and method for detecting and avoiding collisions. This type of system is referred to as a driver assistance system. Driver assistance systems can include sensors located on the vehicle to detect an oncoming collision. The systems may warn the driver of various driving situations to prevent or minimize collisions using any number of available warning systems. Furthermore, driver assistance systems can provide specialized warnings for any number of conditions that could potentially lead to a collision. For example, alerts may be provided for lane departure warnings, forward collision, warnings, blind spot detection, etc.

Existing warning systems typically provide either an audible warning, a dashboard/windshield mounted visual cue, or a combination of the two. The dashboard/windshield mounted visual cues assume that the driver is attentive and forward facing. In cases where the driver is not attentive, or is looking elsewhere, the dashboard/windshield mounted visual cues are ineffective.

SUMMARY

Disclosed is a driver assistance system for a vehicle including: a plurality of lights linearly arranged substantially around an interior perimeter of the vehicle, a controller controllably coupled to the plurality of lights, such that the controller is operable to control the plurality of lights, a hazard detection system communicatively coupled to the controller, the controller including a non-transitory computer readable medium storing instructions for causing the controller to illuminate at least one of the plurality of lights corresponding to a location of a hazard detected by the hazard detection system.

Also disclosed is a method for assisting a driver of a vehicle including the steps of: identifying a hazard using a hazard detection system, and illuminating at least one light of a plurality of lights linearly arranged substantially around an interior perimeter of a vehicle in response to identifying the hazard, thereby indicating a location of the hazard to a driver, wherein the plurality of lights linearly arranged substantially around the interior perimeter of a vehicle at least substantially circumscribes the interior of the car.

BRIEF DESCRIPTION OF THE DRAWINGS

The present disclosure will become more fully understood from the detailed description and the accompanying drawings, wherein.

DETAILED DESCRIPTION

Figure 1:
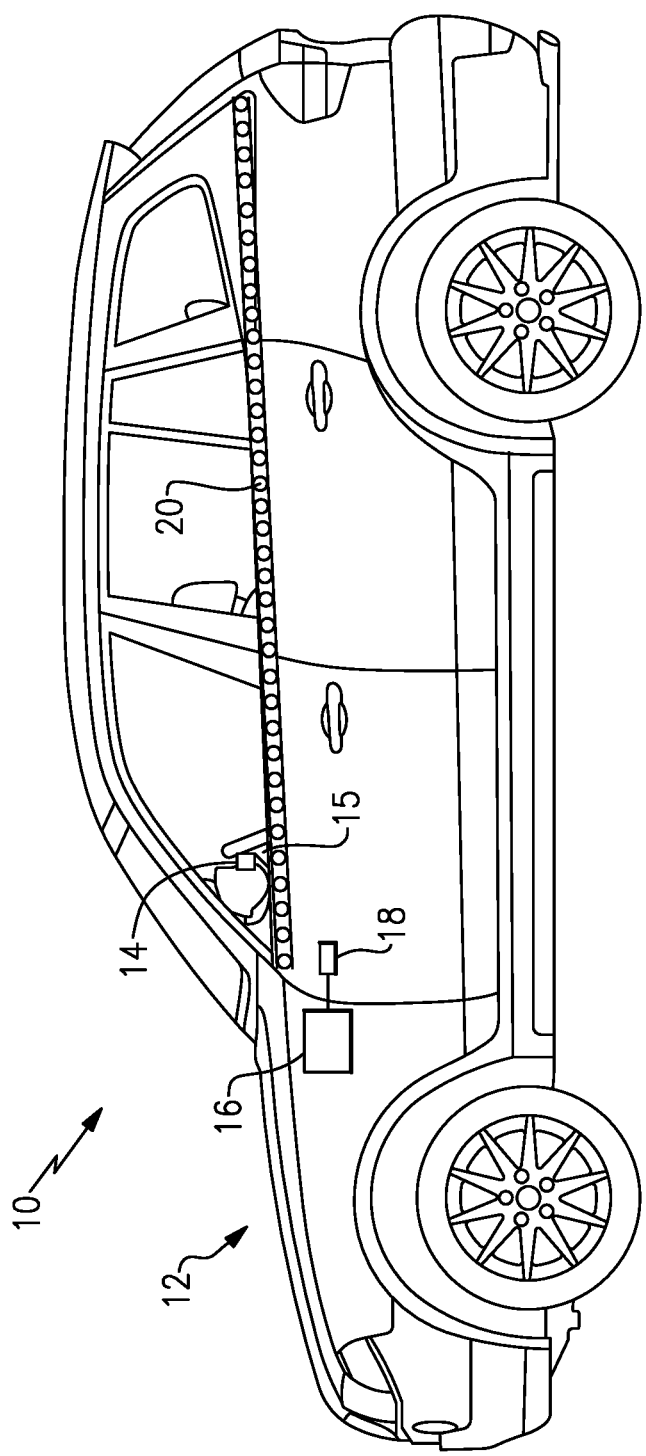
FIG. 1 is a schematic illustration of a side view of a vehicle including a halo alert system.
Figure 2:
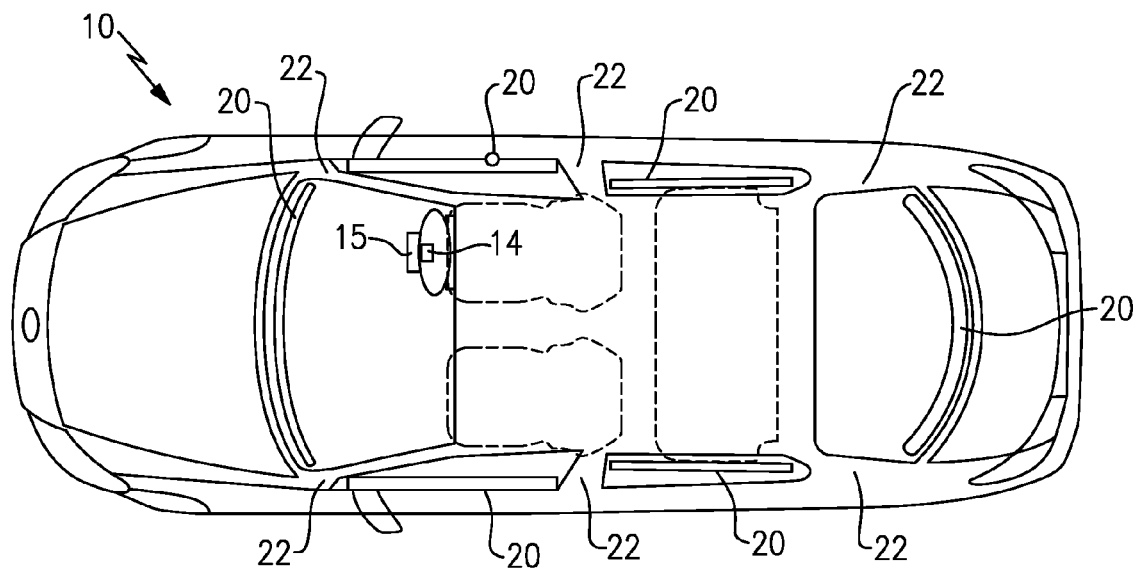
FIG. 2 is a schematic illustration of a top view of the vehicle of FIG. 1.

FIGS. 1 and 2 illustrate a vehicle 10 in a side view (FIG. 1) and a top view (FIG. 2). The vehicle 10 includes a driver assistance system. The driver assistance system is a halo alert system 12. The halo alert system 12 includes a driver analyzer 14 mounted to the steering column 15. The driver analyzer 14 records the driver's head position and transmits the driver's head, eye, pupil, eyelid, and/or other facial feature position or information to a controller 16. The driver analyzer 14 may be a monocular camera, binocular camera, or another type of sensing device capable of providing information used to determine the direction of a driver's gaze. Throughout this disclosure, the relative directions of forward and rear are in reference to the direction which an operator for the vehicle 10 would primarily be facing when operating the vehicle 10. In the illustrated embodiment, the driver analyzer 14 is a camera.

In alternate examples, the driver analyzer 14 can be mounted in any location that provides a view of the driver's head and/or face position such that the controller 16 can determine an approximate direction of the driver's gaze based upon the image generated by the driver analyzer 14. In some examples, this position is in front of the driver. While the driver analyzer 14 is mounted on the steering column in the illustrated example, other mounting locations for the driver analyzer 14 can be utilized. By way of example, the driver analyzer 14 can alternately be positioned at the top and center of the vehicle 10 passenger compartment proximate to the traditional mounting location for a rear view mirror in a position to minimize obstruction of the front windshield. The driver analyzer 14 may also be integrated with, and used by, other vehicle systems, in particular, other systems which utilize a driver's head position.

The controller 16 is connected to the driver analyzer 14 and analyzes the image/data from the driver analyzer 14 to determine the direction of the driver's focus. For example, the controller 16 may analyze the image recorded by a camera and determine the position of the driver's eyes, nose, and mouth. Based on this information the controller 16 can determine from the image the direction of the driver's focus. In some examples, the controller 16 can also use the image to recognize the driver and automatically activate driver specific settings. Alternately, the controller 16 can use any other technique to convert the data from the driver analyzer 14 into an approximate direction of the driver's gaze.

The controller 16 is connected to at least one other vehicle system 18 and halo alert lights 20. The controller 16, the halo alert lights 20, and at least one other vehicle system (such as a blind spot detection system) are collectively referred to as a driver assistance system. In general, the halo alert lights 20 are a ring of lights that substantially circumscribe the interior of the vehicle 10. The halo alert lights 20 are located at various heights within the vehicle 10 such that the lights are easily visible to the operator of the vehicle 10 regardless of the direction of the driver's focus.

In one example, the halo alert lights 20 are LED lights arranged around the interior of the passenger compartment for the vehicle 10. In the illustrated example, the halo alert lights 20 are located proximate to the window height and substantially extend around the interior of the passenger compartment. In another example, the halo alert lights 20 form a complete ring circumscribing the interior of the vehicle 10. In an another example, the halo alert lights 20 include one or more physical breaks 22 in the ring of lights to accommodate vehicle features, such as doors. The ring including physical breaks is referred to herein as substantially circumscribing the interior of the vehicle.

One skilled in the art, having the benefit of this disclosure, can determine the best locations for the halo alert lights 20 for a particular vehicle 10 configuration.

As described above, the controller 16 determines the direction of a driver's focus and can activate the halo alert lights 20 currently in the driver's focus to provide warnings from the other vehicle systems 18 based upon the direction of the driver's focus. The other vehicle system 18 may have the same controller 16 or be controlled by a separate controller linked to the controller 16 that controls the halo alert lights 20. The halo alert lights 20 can activate in multiple colors and/or intensities to indicate the urgency of a particular warning. Furthermore, the halo alert lights 20 can activate sequentially creating a comet effect that directs the driver's focus to a warning zone. In such an example, the halo alert lights 20 initially light at a location in view of the driver's focus and sequentially transition to the warning zone.

In the event that the driver analyzer 14 is disabled, or there is no driver analyzer 14, the controller 16 assumes a worst case scenario and initiates the comet effect at a point in the halo alert lights 20 that is farthest away from the warning zone. In this way, the comet effect necessarily passes through the driver's focus as it transitions to the warning zone.

Figure 3A:
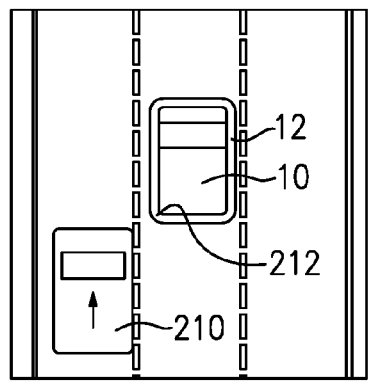
FIG. 3A is a schematic illustration of a top view of the vehicle of FIGS. 1-2.
Figure 3B:
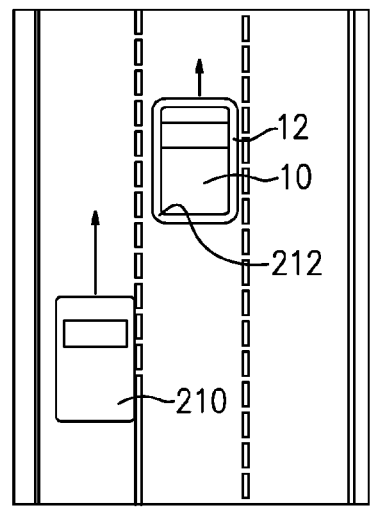
FIG. 3B is a schematic illustrate of a top view of the vehicle of FIGS. 1-3A.
Figure 4A:
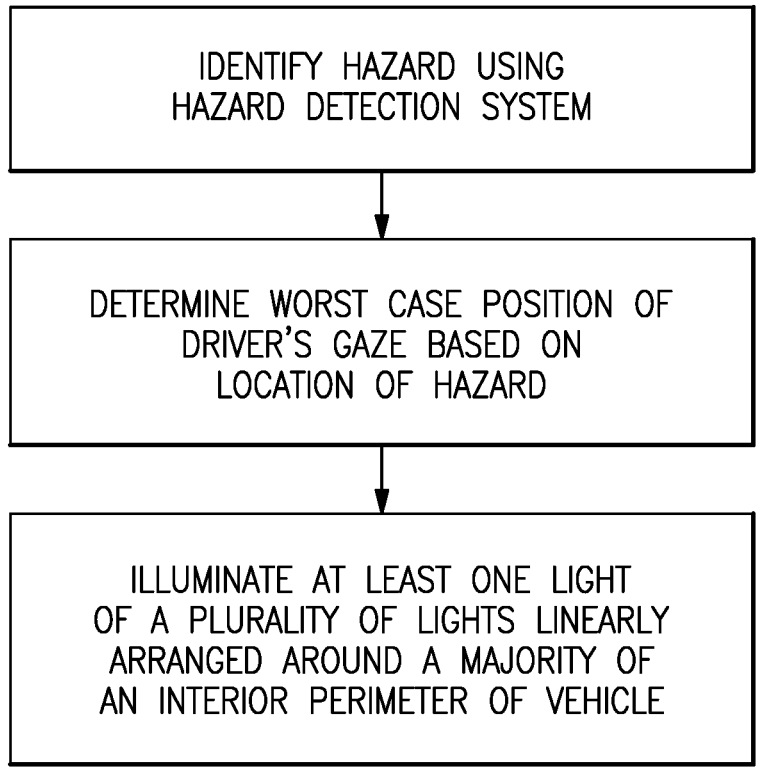
FIG. 4A illustrates steps of a method for assisting a driver of a vehicle.
Figure 4B:
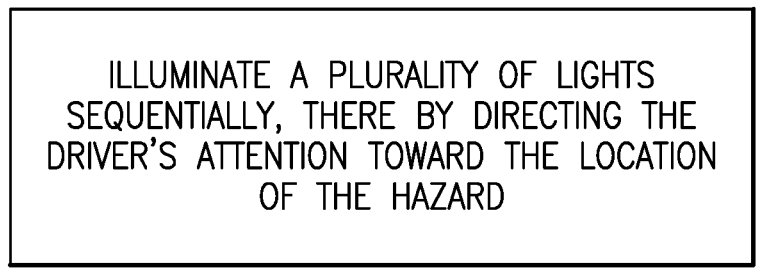
FIG. 4B illustrates a step of a method for assisting a driver of a vehicle.

In the embodiment illustrated in FIGS. 3A and 3B, the halo alert lights 20 light in green, yellow and red to indicate the severity of the warning. The colors green, yellow and red are for example only, and other colors may be used in addition to or in place of the listed colors. In addition to directing the driver's view toward a particular warning zone, as described above, the commet effect can direct the driver's focus to a dashboard, or any other position in the vehicle, depending on the type of warning being indicated.

For example, if the controller 16 determines the driver is looking away from the forward direction of travel the halo alert lights 20 may be lit starting in the current direction of the driver's attention and sequentially lit toward the instrument cluster directing and allowing the driver time to re-focus on the instrument cluster to view the warning provided.

FIGS. 3A and 3B illustrate a vehicle 10 having the halo alert system 12 showing a blind spot detection alert. In the examples of FIGS. 3A and 3B, the above described warning zone would be the position of an object 210 in the blind spot of the vehicle 10. In FIG. 3A the object 210 is located in the blind spot. The halo alert system 12 lights the halo alert lights 20 at the rear driver's side corner 212 of the vehicle 10. This lighting location corresponds to the location of the object 210 detected in the blind spot. The object 210 is traveling at essentially the same speed as the vehicle 10. As the object 210 is maintaining position in the blind spot, the halo alert lights 20 remain lit in the rear corner 212 of the vehicle indicating a potential continuous hazard. If the object 210 moves further along the side of the vehicle 10 the halo alert lights 20 sequentially light, transitioning to the location corresponding to the new position of the object 210.

In FIG. 3B the blind spot detection system 18 detects that the object 210 is moving relative to the vehicle 10. In this example, the halo alert lights 20 are illuminated along the length of the vehicle 10 on the driver's side to correspond to an increased warning zone, as compared to the warning zone of FIG. 3A. Further, in some examples, the halo alert lights 20 can change color to indicate warning intensity. For example, as shown in FIGS. 3A and 3B, the halo alert lights 20 may be illuminated in yellow when an object is detected in a blind spot and may change to red if a driver indicates a turn and/or lane change in the direction of the detected object 210.

Referring to FIGS. 1, 2, 3A and 3B, some alternate example additional systems 18 that can cooperate with the halo alert system 12 include: Electronic Stability Control systems, Adaptive Cruise Control, collision Warning systems, Lane Departure Warning, Blind Spot Detection Systems, etc. For example, a collision warning system provides a pinpoint warning indicating where a collision is about to occur using the halo alert system 12 in a manner similar to that described above with regards to the blind spot detection. This pinpoint type warning may be useful with back up assist systems where objects may be smaller and not visible to the driver, to distinguish from objects that frequently trigger warnings in a back up assist system. For example, a tree close to a drive may frequently trigger a warning. However, an object in the driveway might not be visible and trigger a warning as well. Pinpoint lighting of the halo alert lights 20 will allow a driver to distinguish between the two objects.

As mentioned above, the halo alert lights 20 may be illuminated in multiple colors and/or intensity to indicate the urgency of the warning. Additionally, in some examples, the halo alert lights 20 include multiple rows of lights. The number of rows illuminated may correspond to the severity of the warning, or the multiple rows could be used to illuminate shapes, e.g. arrows, X's, letters, etc. The base brightness of the halo alert lights 20 in some examples is based on the level of ambient lighting at the time. In these examples, the halo alert lights 20 change in intensity to indicate the severity of a warning with a higher intensity indicating a more sever warning.

In yet further alternate examples, the additional systems 18 include an infotainment system. The infotainment system includes a wireless connection to a data network. Through the connection to the data network, the infotainment system can gather news tickers, sports scores, or any other appropriate information. The information is provided to the controller 16 that controls the halo alert lights 20. The controller 16 can then detect when the vehicle 10 is not moving and display the gathered information for the driver.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

What is claimed is:
1. A driver assistance system for a vehicle comprising:
a plurality of lights linearly arranged around a majority of an interior perimeter of the vehicle;
a controller controllably coupled to the plurality of lights, such that the controller is operable to control the plurality of lights;

a hazard detection system communicatively coupled to the controller;

the controller including a non-transitory computer readable medium storing instructions for causing the controller to illuminate at least one of the plurality of lights corresponding to a location of a hazard detected by the hazard detection system; and the non-transitory computer readable medium further including instructions for causing the controller to determine a worst case scenario position of a driver's gaze based on the location of the identified hazard in response to the direction of the driver's gaze being unknown, and for causing the controller to initiate a warning in a position farthest from the hazard.

2. The driver assistance system of claim 1, wherein the plurality of lights comprises a plurality of adjacent rows of lights.

3. The driver assistance system of claim 1, wherein each light in the plurality of lights is an LED light.

4. The driver assistance system of claim 1, further comprising a driver analyzer mounted in an interior of the vehicle and operable to detect a direction of a driver's gaze, wherein the driver analyzer is communicatively coupled to the controller such that images detected by the driver analyzer are transmitted to the controller.

5. The driver assistance system of claim 4, wherein the driver analyzer is a camera.

6. The driver assistance system of claim 1, wherein the controller further comprises an infotainment system and wherein the plurality of lights are configured to display at least one of text and symbolic information received from the infotainment system.

7. The driver assistance system of claim 1, wherein the plurality of lights linearly arranged around the majority of the interior perimeter of the vehicle are a ring of lights that circumscribes the interior of the vehicle.

8. The driver assistance system of claim 7, wherein the ring of lights comprises at least one break.

9. A method for assisting a driver of a vehicle comprising the steps of:

identifying a hazard using a hazard detection system;

determining a worst case position of a driver's gaze based on a location of the identified hazard in response to the direction of the driver's gaze being unknown; and illuminating at least one light of a plurality of lights linearly arranged around a majority of an interior perimeter of the vehicle in response to identifying the hazard, thereby indicating a location of the hazard to a driver, wherein the plurality of lights linearly arranged substantially around the interior perimeter of the vehicle at least substantially circumscribes the interior of the car.

10. The method of claim 9, wherein the step of illuminating at least one light comprises illuminating a plurality of lights sequentially thereby directing the driver's attention toward the location of the hazard.

11. The method of claim 9, wherein a first illuminated light in the plurality of lights is a light located at a worst case scenario gaze position, and wherein a final illuminated light in the plurality of lights is a light located in a position corresponding to the identified hazard zone.

12. The method of claim 9, further comprising the steps of identifying a direction of the driver's gaze using a driver analyzer.

13. The method of claim 12, wherein the step of illuminating at least one light comprises illuminating a plurality of lights sequentially, thereby directing the driver's attention toward the location of the hazard, and wherein the sequential illumination of lights begins with a light positioned in the driver's gaze and ends with illumination of a light in a location corresponding to the location of the hazard.

* * * * *